US011679701B2

(12) United States Patent
Madrid et al.

(10) Patent No.: US 11,679,701 B2
(45) Date of Patent: Jun. 20, 2023

(54) SEAT BACK ENERGY ABSORBER (71) Applicant: Safran Seats USA LLC, Gainesville, TX (US)

(72) Inventors: Nahum Madrid, Denton, TX (US); Solomon Livingston, Denton, TX (US); Francisco Salcedo, Argyle, TX (US); Christopher Stewart, Saint Jo, TX (US); Kevin Waters, Denton, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/494,939

(22) Filed: Oct. 6, 2021

(65) Prior Publication Data

US 2023/0108769 A1    Apr. 6, 2023

(51) Int. Cl.
*B64D 11/06* (2006.01)
*B60N 2/42* (2006.01)
*B60N 2/66* (2006.01)
*B60N 2/68* (2006.01)
*B60N 2/22* (2006.01)

(52) U.S. Cl.
CPC .............. *B60N 2/42* (2013.01); *B60N 2/4214* (2013.01); *B60N 2/66* (2013.01); *B60N 2/68* (2013.01); *B64D 11/0619* (2014.12); *B60N 2/22* (2013.01); *B60N 2205/30* (2013.01)

(58) Field of Classification Search
CPC .......................... B60N 2/4214; B64D 11/0619
See application file for complete search history.

(56) References Cited

U.S. PATENT DOCUMENTS

| 3,583,530 | A | * | 6/1971 | De Venne | A44B 11/2546 293/133 |
| 3,913,707 | A | * | 10/1975 | Wastenson | F16F 7/125 293/133 |
| 4,523,730 | A | * | 6/1985 | Martin | B64D 25/04 297/216.13 |
| 5,133,587 | A | * | 7/1992 | Hadden, Jr. | B60N 2/42709 297/146 |
| 5,174,421 | A | * | 12/1992 | Rink | B60N 2/42709 293/133 |
| 5,273,240 | A | * | 12/1993 | Sharon | F16F 7/125 188/374 |
| 5,320,308 | A | * | 6/1994 | Bilezikjian | B60N 2/42745 297/216.1 |
| 5,427,214 | A | * | 6/1995 | Prottengeier | B60R 19/34 293/133 |
| 5,772,280 | A | * | 6/1998 | Massara | B60N 2/4214 297/216.12 |
| 6,312,049 | B1 | * | 11/2001 | Sullivan | B60N 2/42745 297/216.14 |

(Continued)

*Primary Examiner* — Timothy J Brindley
(74) *Attorney, Agent, or Firm* — Kilpatrick Townsend & Stockton LLP (57) ABSTRACT A passenger seat for a passenger vehicle including but not limited to an aircraft may include a seat base, a seat back, and an energy absorption system. The energy absorption system is spherically coupled to the seat base and spherically coupled to the seat back, and includes a dampening member and a support assembly. The dampening member is movable relative to the support assembly responsive to a load applied on the seat back such that engagement between the support assembly and the dampening member dampens the load.

20 Claims, 8 Drawing Sheets (56) References Cited

U.S. PATENT DOCUMENTS

| | | | | |
|---|---|---|---|---|
| 6,478,256 B1* | 11/2002 | Williamson | ......... | B64D 11/064 |
| | | | | 297/216.14 |
| 6,672,575 B2* | 1/2004 | Flower | ................... | F16F 7/085 |
| | | | | 267/134 |
| 6,820,931 B2* | 11/2004 | Ruff | ................... | B60N 2/42736 |
| | | | | 297/216.17 |
| 10,689,118 B2* | 6/2020 | Pierson-Moonan | ... | B64D 25/04 |
| 2014/0070578 A1* | 3/2014 | Szelagowski | ...... | B60N 2/42745 |
| | | | | 297/216.13 |

* cited by examiner

SEAT BACK ENERGY ABSORBER

FIELD OF THE INVENTION

The field of the invention relates to passenger seats, and, more particularly, to energy absorbers for passenger seats.

BACKGROUND

Passenger vehicles, such as aircraft, buses, trains, ships, and automobiles, include passenger seats for passengers to sit in and utilize during travel. Some current seat-implemented solutions for improving passenger safety in the event of a crash have relied on a sufficiently strong seat structure, but such solutions are both heavy and costly to implement. Other current solutions for improving passenger safety do not allow for sufficient reduction in head velocities during a crash event and/or can result in high lumbar loads if the loads are not dissipated correctly.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat includes a seat base, a seat back pivotably connected to the seat base, and an energy absorption system spherically coupled to the seat base and spherically coupled to the seat back. The energy absorption system includes a dampening member and a support assembly, and the dampening member is movable relative to the support assembly such that engagement between the support assembly and the dampening member dampens a load on the seat back.

In some embodiments, the energy absorption system is configured to dampen the load and reduce a head impact criteria. In certain embodiments, the support assembly is on the dampening member such that the dampening member extends through the support assembly, and the dampening member is compressible as the dampening member moves through the support assembly. In various embodiments, the support assembly is configured to decrease an outer diameter of the dampening member as the dampening member moves through the support assembly.

In certain aspects, at least a portion of the support assembly may include a material having a hardness is greater than a hardness of a material of the dampening member. In various embodiments, the energy absorption system also includes a stop that provides a maximum movement limit for the dampening member. In some embodiments, the support assembly is spherically coupled to the seat base and wherein the dampening member is spherically coupled to the seat back.

In some examples, the dampening member includes an elongated rod, the support assembly includes a die comprising an inner wall defining a central aperture, and the elongated rod at least partially extends through the central aperture of the die such that the die is on the elongated rod. The elongated rod may be spherically coupled to the seat back and the die may be spherically coupled to the seat base. In certain embodiments, the elongated rod includes a first end and a second end opposite the first end, the first end is spherically coupled to the seat back, and the second end comprises a stop. The die may be on the elongated rod between the first end and the second end, and the die may engage the stop on the elongated rod at a maximum movement position of the elongated rod relative to the support assembly. In various embodiments, at least a portion of the rod is hollow, and a wall thickness of the portion of the rod that is hollow is not constant. According to various examples, the rod may include an outer diameter, a first end, and a second end opposite from the first end, and the outer diameter is not constant between the first end and the second end. In some cases, the inner wall of the die is not constant.

In various embodiments, the support assembly includes a die spherically coupled to the seat base, and the dampening member includes an elongated rod and a crushable member. The elongated rod may extend at least partially through the die and be movable through the die. The elongated rod may include a first end spherically coupled to the seat back and a second end opposite from the first end. The crushable member may be on the elongated rod between the second end and the die, and the crushable member is deformed or crushed as the elongated rod moves through the die.

In certain embodiments, the dampening member is pulled through the support assembly responsive to the load.

According to certain embodiments of the present invention, a passenger seat includes a seat base, a seat back pivotably connected to the seat base, and an energy absorption system having a support assembly and a dampening member movable relative to the support assembly. The support assembly is coupled to the seat base and the dampening member is coupled to the seat back, and the dampening member is configured to selectively engage the support assembly responsive to a load on the seat back to dampen the load.

In some embodiments, the support assembly is spherically coupled to the seat base and the dampening member is spherically coupled to the seat back. In various embodiments, the dampening member is movable through the support assembly responsive to the load, and the dampening member is configured to selectively engage the support assembly such that the support assembly deforms, compresses, or frictionally engages the dampening member to dampen the load.

According to certain embodiments of the present invention, a passenger seat includes a seat base having a forward end and an aft end, and a seat back pivotably connected to the seat base and having a top end and a bottom end. The passenger seat also includes an energy absorption system having a support assembly and a dampening member movable relative to and through the support assembly. The dampening member may be coupled to the seat back proximate to the bottom end of the seat back, and the support assembly may be coupled to the seat base proximate to the aft end of the seat base. In certain embodiments, the dampening member is movable relative to and through the support assembly responsive to a load on the seat back, and movement of the dampening member through the support assembly dampens the load.

In various embodiments, the support assembly is spherically coupled to the seat base and the dampening member is spherically coupled to the seat back. In some embodiments, at least one of an outer diameter of the dampening member, a diameter of a central aperture of the support assembly, or a wall thickness of the dampening member is not constant.

According to certain embodiments of the present invention, a method is provided for dampening a load applied to a seat back of a passenger seat using an energy absorption system including at least one support assembly and at least one dampening member. The method includes receiving a load to a seat back, pivoting the seat back responsive to the applied load, and moving the at least one dampening member relative to the support assembly responsive to the load applied to the seat back to dampen the load and reduce a head impact criteria.

According to certain embodiments of the present invention, a passenger seat includes a seat base, a pivotable seat back, and a seat belt coupled to an upper area of the pivotable seat back. The passenger seat also includes an energy absorption system spherically coupled to the seat base at a first attachment point and spherically coupled to the seat back at a second attachment point. The energy absorption system includes at least one support assembly and at least one dampening member movable relative to the support assembly responsive to a load applied to the pivotable seat back to dampen the load and reduce a head impact criteria Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide energy absorption systems for passenger seats. While the energy absorption systems are discussed for use with aircraft seats, they are by no means so limited. Rather, embodiments of the energy absorption systems may be used in passenger seats or other seats of any type or otherwise as desired.

In certain embodiments, the energy absorption systems described herein are provided on a seat back of a passenger seat and may allow for precise tuning and/or adjustment to provide a desired dampening or energy absorption during a dynamic event, including but not limited to a crash. In various aspects, the energy absorption systems described herein may reduce the loads imparted to the seat back during a dynamic event compared to traditional passenger seats. The energy absorption systems may also reduce head velocity or displacement during a dynamic event, which may provide lower Head Impact Criteria (HIC) measurements compared to traditional passenger seats. In some embodiments, the energy absorption systems described herein may provide improved lumbar loads and/or neck injury criteria measurements during a dynamic event compared to traditional passenger seats. Optionally, the energy absorption systems described herein may be used in conjunction with a safety belt such as a shoulder belt to further slow or reduce movement of the passenger during a dynamic event, and in some cases the energy absorption system may be optimized or adjusted for use with the safety belt. In some embodiments, the energy absorption systems may help dissipate energy over an extended period of time compared to traditional passenger seats.

Figure 1:
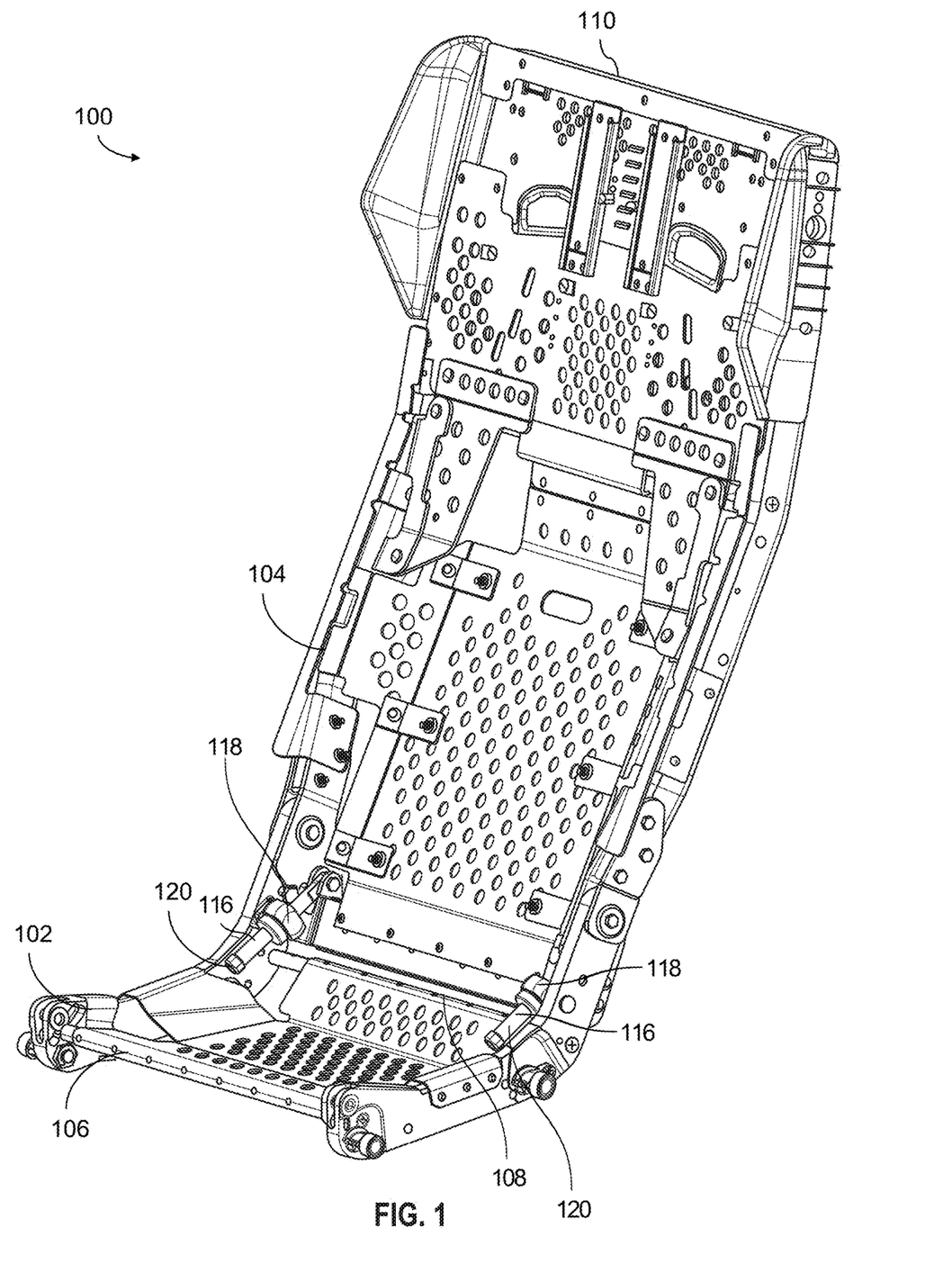
FIG. 1 illustrates a passenger seat with an energy absorption system according to certain embodiments of the present invention.

FIGS. 1-9 illustrate an example of a passenger seat 100 according to certain embodiments of the present invention. As best illustrated in FIG. 1, the passenger seat 100 includes a seat base 102 and a seat back 104 coupled to the seat base 102. In certain embodiments, the seat back 104 is pivotably coupled to the seat base 102 such that an angle or position of the seat back 104 can be adjusted as desired (e.g., between a taxiing, takeoff, and landing position and a reclined position). The seat base 102 generally includes a forward end 106 and an aft end 108, and the seat back 104 generally includes a top end 110 and a bottom end 112. The particular seat base 102 and seat back 104 illustrated should not be considered limiting, and in other embodiments the passenger seat 100 may include various other seat bases and/or seat backs as desired.

Figure 2:
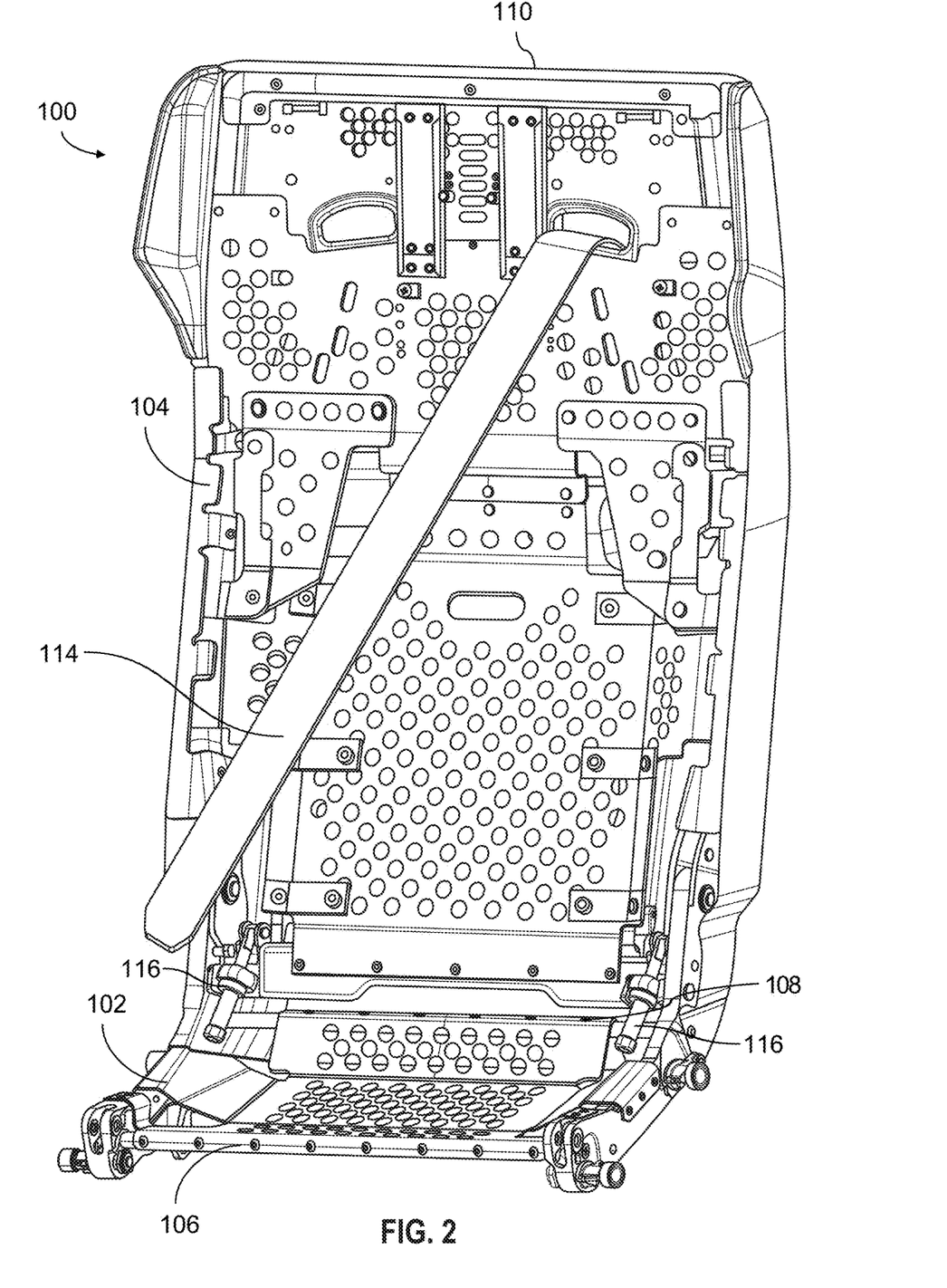
FIG. 2 illustrates the passenger seat of FIG. 1 with a safety belt.

Optionally, and as illustrated in FIG. 2, the passenger seat 100 may include a safety belt 114 such as a shoulder strap or belt that a passenger may utilize while seated in the passenger seat 100. The particular safety belt 114 illustrated should not be considered limiting, and in other embodiments the safety belt 114 may be omitted.

Figure 3:
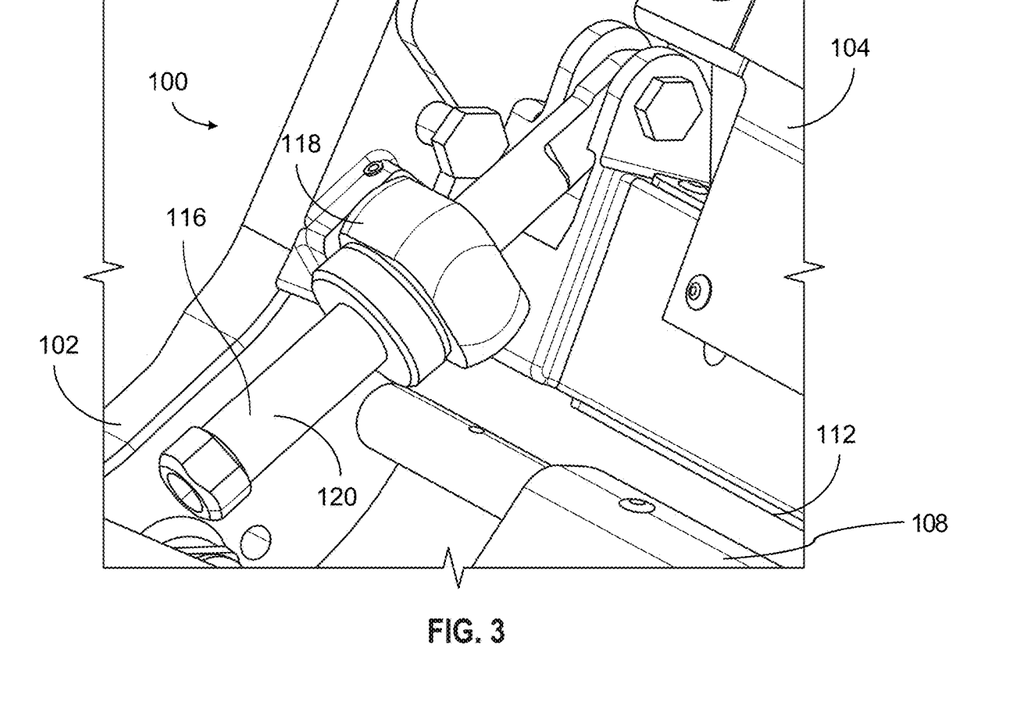
FIG. 3 illustrates a portion of the passenger seat of FIG. 1.
Figure 4:
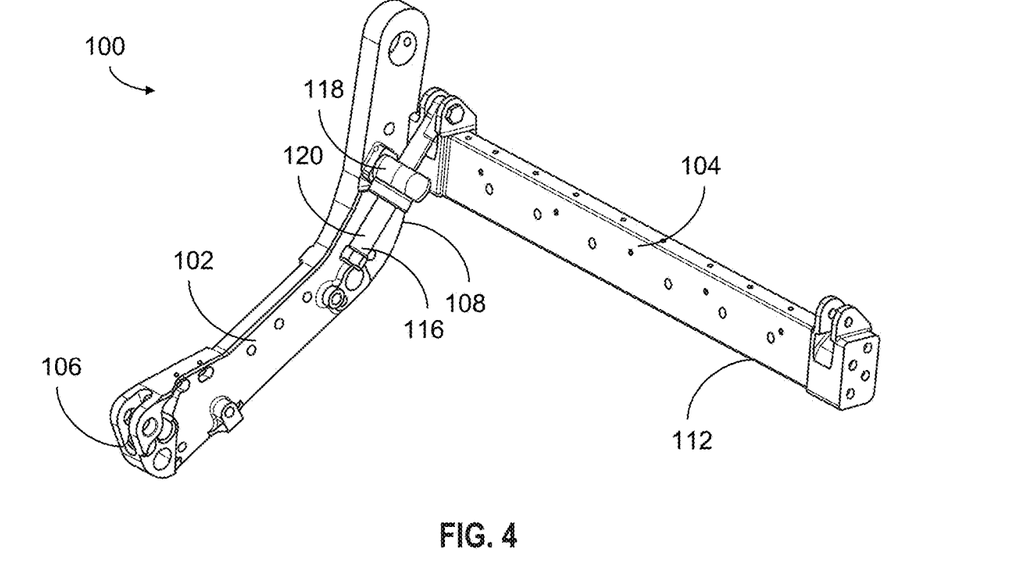
FIG. 4 illustrates another portion of the passenger seat of FIG. 1.

In various embodiments, the passenger seat 100 includes at least one energy absorption system 116 for dampening loads during a dynamic event (discussed in greater detail below). In the embodiment illustrated, the passenger seat 100 includes two energy absorption system 116, although any number could be used with the passenger seat 100 in other embodiments. As best illustrated in FIGS. 3 and 4, an energy absorption system 116 may be coupled to both the seat base 102 and the seat back 104. In certain embodiments, the energy absorption system 116 may be coupled to the seat base 102 proximate to the aft end 108 and may be coupled to the seat back 104 proximate to the bottom end 112. In various embodiments, the energy absorption system 116 may be spherically coupled to each of the seat base 102 and the seat back 104. The energy absorption system 116 spherically coupled to the seat base 102 and the seat back 104 may allow for an orientation of the energy absorption system 116 relative to the passenger seat 100 to change during a dynamic event while remaining coupled to the passenger seat 100. In some embodiments, the energy absorption system 116 spherically coupled to the seat base 102 and the seat back 104 may optionally ensure that purely tensile loading is applied to the energy absorption system 116 during the dynamic event.

Each energy absorption system 116 includes a support assembly 118 and a dampening member 120 that is movable relative to the support assembly 118. Optionally, the dampening member 120 may include a stop 148 that engages the support assembly 118 at a maximum movement or stroke position of the dampening member 120 relative to the support assembly 118. In certain embodiments, and as best illustrated in FIGS. 3 and 4, the support assembly 118 may be spherically or otherwise coupled to the seat base 102 such that the support assembly 118 can rotate or otherwise change its orientation relative to the seat base 102. The dampening member 120 may be rotatably or otherwise coupled to the seat back 104 such that the dampening member 120 can rotate or otherwise change its orientation relative to the seat back 104. The support assembly 118 and the dampening member 120 may be constructed from various materials as desired, and in certain embodiments, the material of at least a portion of the support assembly 118 may optionally have a hardness that is greater than a hardness of the material of the dampening member 120.

The support assembly 118 and/or dampening member 120 may be various devices or components as desired for dissipating energy during a dynamic event and dampening a load. In the embodiment of FIGS. 1-9, and as best illustrated in FIGS. 7 and 8, the support assembly 118 includes a die 122 having a first end 124, a second end 126, and an inner wall 128 defining a central aperture 130 extending from the first end 124 to the second end 126. In certain embodiments, the central aperture 130 may have a shape such that the support assembly 118 can be at least partially positioned on the dampening member 120 and/or such that the dampening member 120 at least partially extends through the support assembly 118. In various embodiments, the die 122 of the support assembly 118 is a material having a hardness that is greater than the hardness of the material of the dampening member 120. The particular shape and/or features of the die 122 illustrated should not be considered limiting, and in other embodiments the support assembly 118 need not include a die 122, and other suitable devices or components for engaging the dampening member 120 may be used as desired. In certain aspects, one or more characteristics of the die 122 may be controlled as desired to provide a desired amount of energy dissipation and load dampening. Such characteristics may include, but are not limited to, a shape of the die 122, a shape of the central aperture 130, a material of the die 122, a length of the die 122, a transverse dimension (e.g., diameter) of the central aperture 130, combinations thereof, and/or other characteristics as desired. As best illustrated in FIG. 8 and as discussed in detail below, in the embodiment illustrated, the central aperture 130 has a varying or nonconstant transverse dimension that progressively decreases from the first end 124 to the second end 126.

Figure 5:
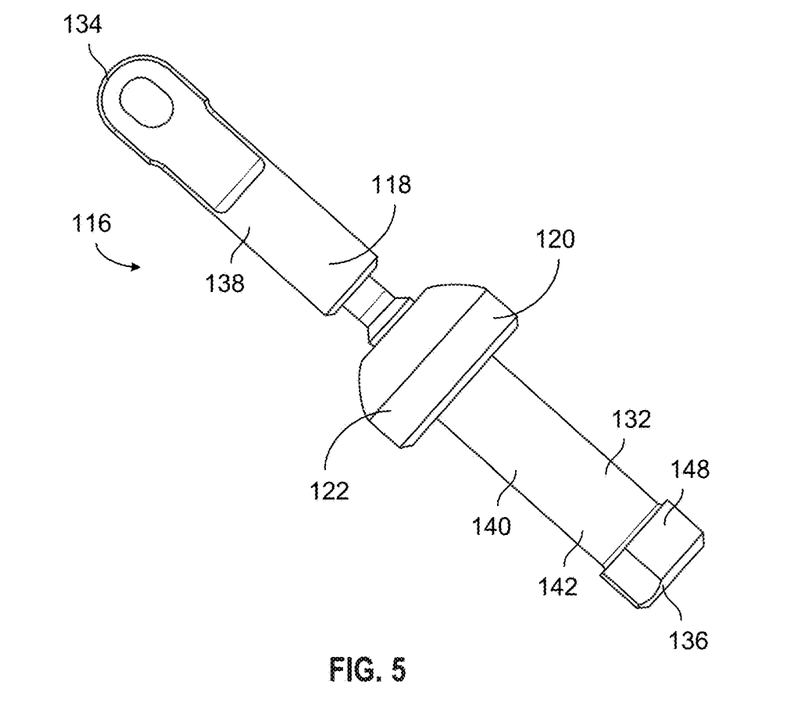
FIG. 5 illustrates a support assembly and dampening member of the energy absorption system of FIG. 1.
Figure 6:
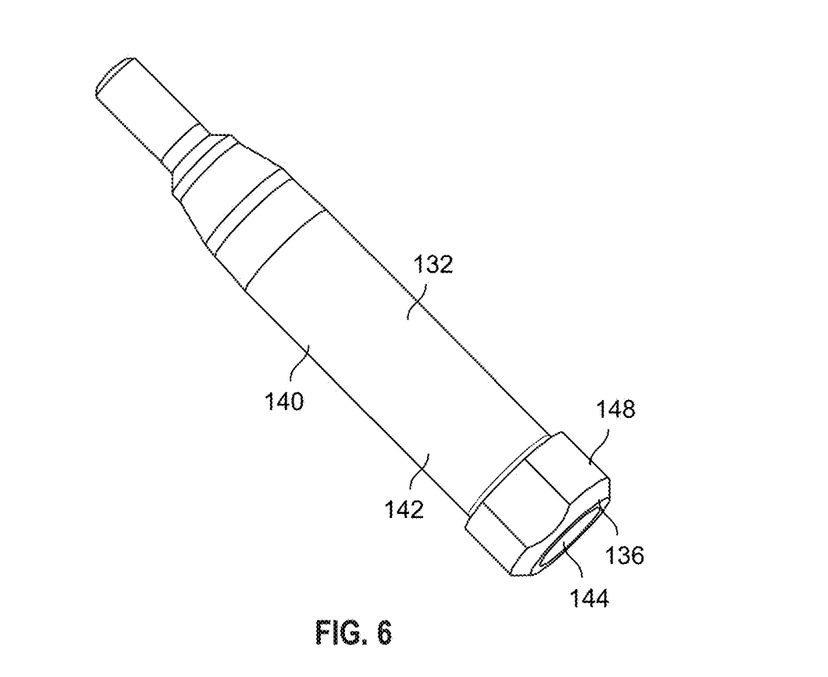
FIG. 6 illustrates a portion of the dampening member of FIG. 5.
Figure 7:
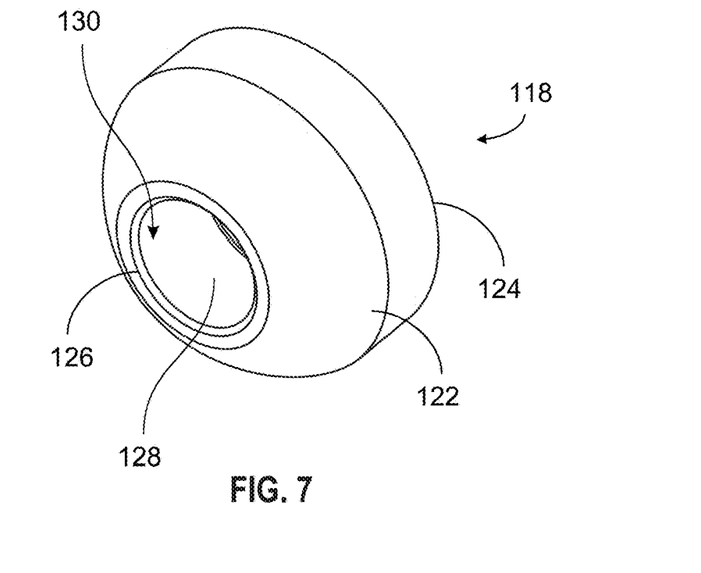
FIG. 7 illustrates the support assembly of FIG. 5
Figure 8:
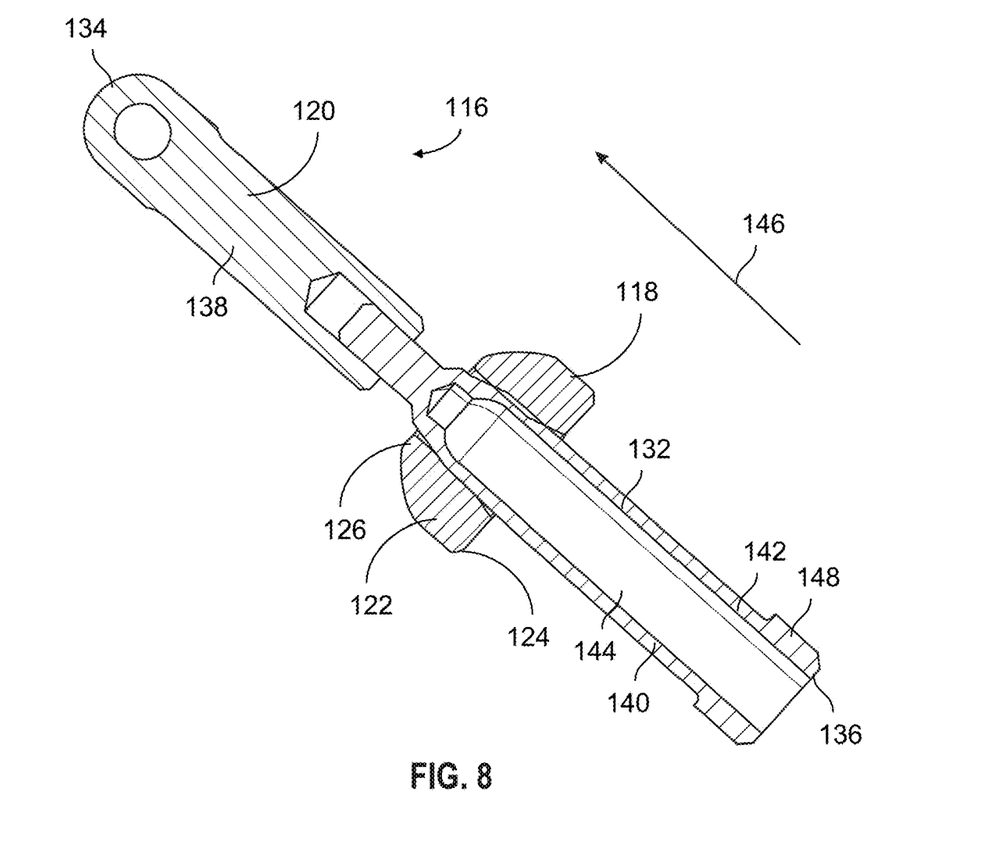
FIG. 8 is a sectional view of the support assembly and dampening member of FIG. 5.

In the embodiment of FIGS. 1-9, and as best illustrated in FIGS. 5, 6, and 8, the dampening member 120 is an elongated rod 132. The elongated rod 132 includes a first end 134, and second end 136, a connecting portion 138 for coupling the dampening member 120 to the seat back 104, and an engagement portion 140 for engaging the support assembly 118 and provide energy dissipation and load dampening during a dynamic event. In the embodiment illustrated, the connecting portion 138 and the engagement portion 140 are separate components that are connected to each other using various techniques or mechanisms as desired; however, in other embodiments, the connecting portion 138 and engagement portion 140 may be monolithically or integrally formed as a single component. In the embodiment illustrated, the connecting portion 138 and the engagement portion 140 are connected via threading forming a threaded engagement.

The engagement portion 140 of the elongated rod 132 includes a wall 142. Optionally, the wall 142 include a cavity 144 such that the engagement portion 140 is at least partially hollow, although in other embodiments it need not be hollow. Similar to the die 122, one or more characteristics of the elongated rod 132 may be controlled as desired to provide a desired amount of energy dissipation and load dampening. Such characteristics may include, but are not limited to, a shape of the wall 142, a shape of the cavity 144, a material of the engagement portion 140 of the elongated rod 132, a length of the engagement portion 140 of the elongated rod 132, a transverse dimension (e.g., diameter) of the cavity 144, a thickness of the wall 142, combinations thereof, and/or other characteristics as desired. As best illustrated in FIG. 8 and as discussed in detail below, in the embodiment illustrated, engagement portion 140 of the elongated rod 132 includes the wall 142 having a varying or nonconstant wall thickness, the wall 142 having an outer transverse dimension that is varying or nonconstant, and the cavity 144 having a varying shape.

When the energy absorption system 116 of FIGS. 1-9 is assembled, and as best illustrated in FIG. 8, the die 122 is positioned on the elongated rod 132 between the first end 134 and the second end 136 of the elongated rod 132 and/or the elongated rod 132 extends at least partially through the central aperture 130 of the die 122.

Figure 9:
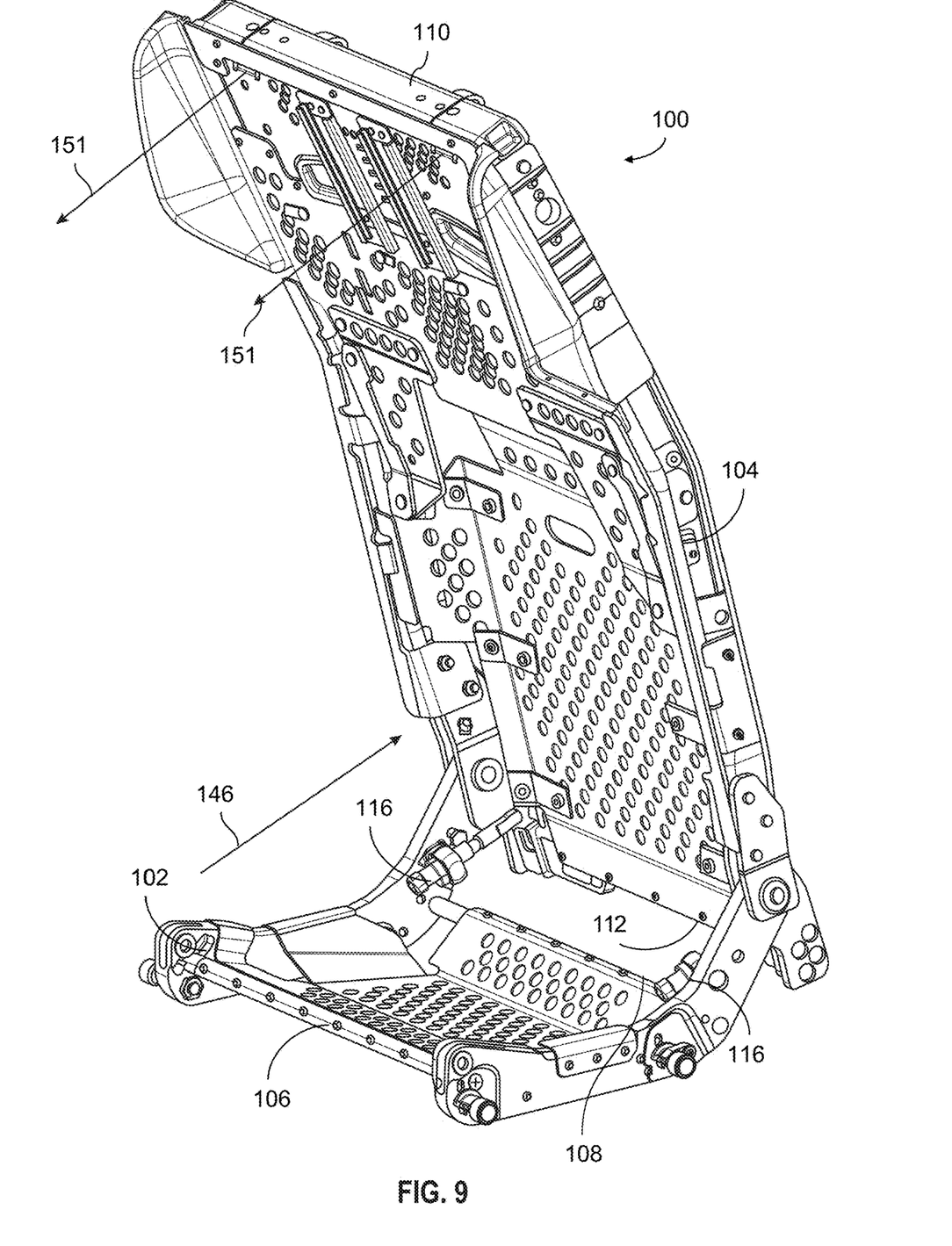
FIG. 9 illustrates the passenger seat of FIG. 1 being subjected to an impact load.

Referring to FIG. 9, during a dynamic event, a load (represented by arrows 151) may be applied to the seat back 104. In cases including the safety belt 114, the energy absorption system 116 may accommodate increased loads on the seat bask 104 introduced by the safety belt 114.

The loads applied to the seat back 104 during the dynamic event may cause the elongated rod 132 to be pulled through the die 122 (represented by arrows 146 in FIGS. 8 and 9). In the embodiment of FIGS. 1-9, the elongated rod 132 moving through the die 122 engages the die 122 within the central aperture 130 (e.g., due to the varying transverse dimension of the central aperture 130 and/or the varying outer transverse dimension of the wall 142). Such engagement may cause the elongated rod 132 to compress and/or deform as the rod 132 is pulled through the die 122, thereby providing load dampening. In some cases, the die 122 may reduce a diameter of the rod 132 as the rod 132 is pulled through the die. At a maximum movement or stroke position, the stop 148 engages the support assembly 118, which may prevent further movement of the dampening member 120 through the support assembly 118.

Figure 10:
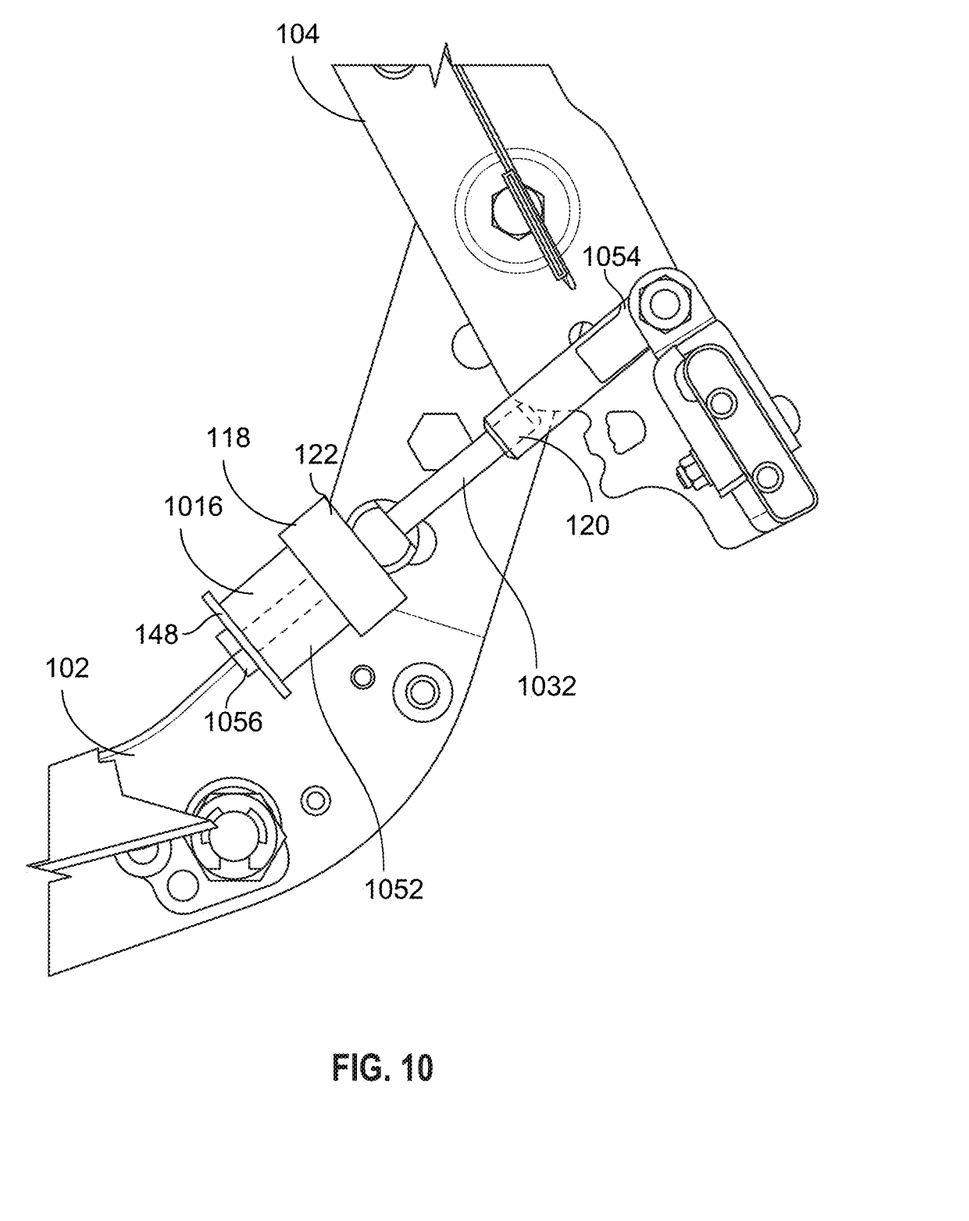
FIG. 10 illustrates a portion of a passenger seat with an energy absorption system according to aspects of the present invention.

As mentioned, one or more characteristics of the support assembly 118 and/or the dampening member 120 may be controlled or adjusted as desired to provide a desired amount of energy dissipation and load dampening. Such characteristics may include, but are not limited to, materials, dimensions, inclusion or omission of features or components, combinations thereof, and/or other characteristics of the support assembly 118 and/or the dampening member 120 as desired. In certain embodiments, the one or more characteristics may be controlled to meet structural or passenger safety needs as desired. In some cases, the one or more characteristics may optionally be controlled or adjusted as desired to improve MC values, lumbar loads, neck injury criteria, seat structural loads, etc. Optionally, the energy absorption system may be optimized for use with the safety belt 114, although it need not be in other embodiments. In certain embodiments, the one or more characteristics may be controlled to dissipate energy over an extended period of time, FIG. 10 illustrates another example of an energy absorption system 1016 according to various embodiments. Compared to the energy absorption system 116, the energy absorption system 1016 includes the die 122 as the support assembly 118 and includes an elongated rod 1032 and a crushable member 1052 as the dampening member 120. The elongated rod 1032 includes a first end 1054 and a second end 1056, and the elongated rod 1032 extends at least partially through the die 122. In this embodiment, and as illustrated in FIG. 10, crushable member 1052 is supported on the elongated rod 1032 between the second end 1056 and the die 122. Responsive to a load from a dynamic event, the rod 1032 may be pulled through the die 122, and such movement deforms and/or crushes the crushable member 1052 to provide the load dampening. In this embodiment, the crushable member 1052 may be various materials that can be at least selectively crushed and/or deformed to provide energy absorption.

Figure 11:
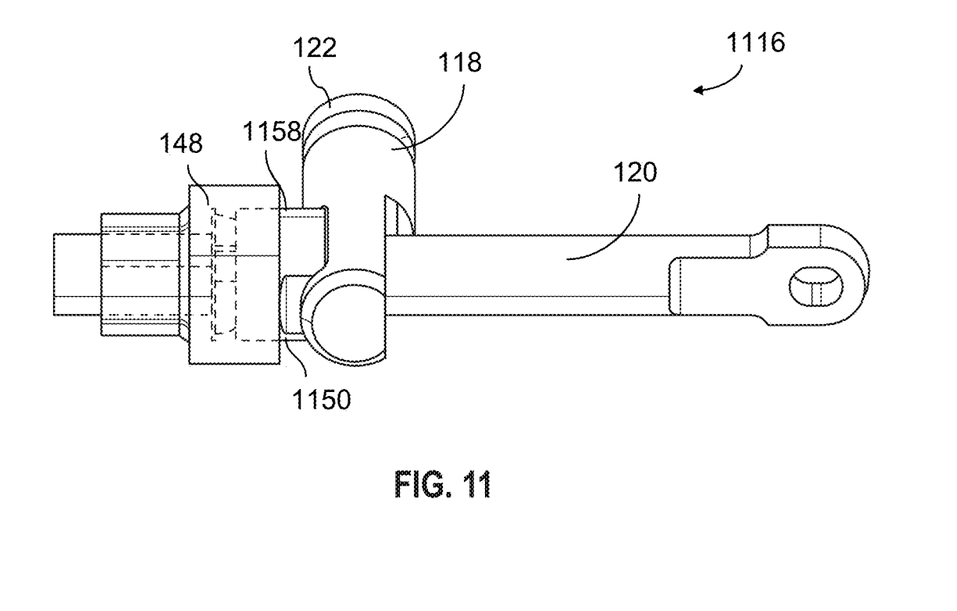
FIG. 11 illustrates an energy absorption system according to aspects of the present invention.
Figure 12:
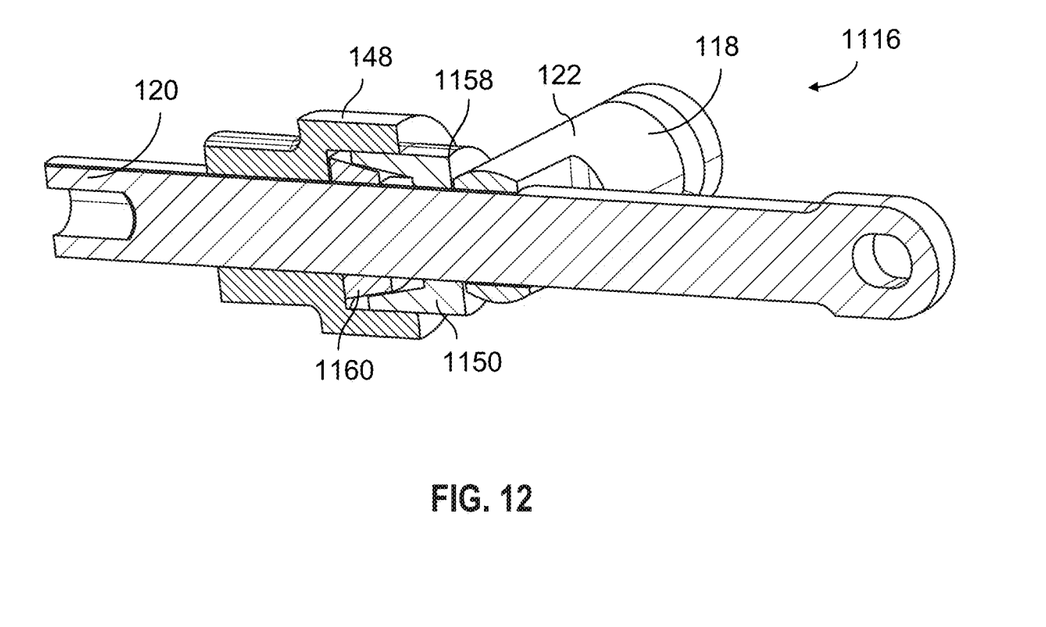
FIG. 12 is a sectional view of the energy absorption system of FIG. 11.

FIGS. 11 and 12 illustrate another example of an energy absorption system 1116. Compared to the energy absorption system 116, the energy absorption system 1116 includes the die 122 as the support assembly 118 and an elongated rod 1132 and a friction mechanism 1150 as the dampening member 120. Compared to the elongated rod 132, the elongated rod 1132 is a monolithic or integrally formed component. The friction mechanism 1150 may include a first component 1158 and a second component 1160 that selectively, frictionally engage each other responsive to a dynamic event to provide load dampening. Optionally, the first component 1158 may at least partially receive the second component 1160 responsive to the dynamic event and to frictionally engage the second component 1160. In certain aspects, at least one characteristic of the first component 1158 and/or the second component 1160 may be controlled as desired to provide a desired amount of energy dissipation. Various other types of friction mechanisms may be used in other embodiments as desired, and as mentioned, other devices or components may be used as the support assembly 118 and/or the dampening member 120 as desired.

A collection of exemplary embodiments are provided below, including at least some explicitly enumerated as "illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A passenger seat comprising: a seat base; a seat back pivotably connected to the seat base; and an energy absorption system spherically coupled to the seat base and spherically coupled to the seat back, the energy absorption system comprising a dampening member and a support assembly, wherein the dampening member is movable relative to the support assembly such that engagement between the support assembly and the dampening member dampens a load on the seat back.

Illustration 2. The passenger seat of any preceding or subsequent illustrations or combination of illustrations, wherein the energy absorption system is configured to dampen the load and reduce a head impact criteria.

Illustration 3. The passenger seat of any preceding or subsequent illustrations or combination of illustrations, wherein the support assembly is on the dampening member such that the dampening member extends through the support assembly, and wherein the dampening member is compressible as the dampening member moves through the support assembly.

Illustration 4. The passenger seat of any preceding or subsequent illustrations or combination of illustrations, wherein the support assembly is configured to decrease an outer diameter of the dampening member as the dampening member moves through the support assembly.

Illustration 5. The passenger seat of any preceding or subsequent illustrations or combination of illustrations, wherein the support assembly comprises die, and wherein the die comprises a material having a hardness is greater than a hardness of a material of the dampening member.

Illustration 6. The passenger seat of any preceding or subsequent illustrations or combination of illustrations, wherein the energy absorption system further comprises a stop that provides a maximum movement limit for the dampening member.

Illustration 7. The passenger seat of any preceding or subsequent illustrations or combination of illustrations, wherein the support assembly is spherically coupled to the seat base and wherein the dampening member is spherically coupled to the seat back.

Illustration 8. The passenger seat of any preceding or subsequent illustrations or combination of illustrations, wherein the dampening member comprises an elongated rod, wherein the support assembly comprises a die comprising an inner wall defining a central aperture, and wherein the elongated rod at least partially extends through the central aperture of the die such that the die is on the elongated rod.

Illustration 9. The passenger seat of any preceding or subsequent illustrations or combination of illustrations, wherein the elongated rod is spherically coupled to the seat back and wherein the die is spherically coupled to the seat base.

Illustration 10. The passenger seat of any preceding or subsequent illustrations or combination of illustrations, wherein the elongated rod comprises a first end and a second end opposite the first end, wherein the first end is spherically coupled to the seat back, wherein the second end comprises a stop, wherein the die is on the elongated rod between the first end and the second end, and wherein the die is configured to engage the stop on the elongated rod at a maximum movement position of the elongated rod relative to the support assembly.

Illustration 11. The passenger seat of any preceding or subsequent illustrations or combination of illustrations, wherein at least a portion of the rod is hollow, and wherein a wall thickness of the portion of the rod that is hollow is not constant.

Illustration 12. The passenger seat of any preceding or subsequent illustrations or combination of illustrations, wherein the rod comprises an outer diameter, a first end, and a second end opposite from the first end, and wherein the outer diameter is not constant between the first end and the second end.

Illustration 13. The passenger seat of any preceding or subsequent illustrations or combination of illustrations, wherein the inner wall of the die is not constant.

Illustration 14. The passenger seat of any preceding or subsequent illustrations or combination of illustrations, wherein the support assembly comprises a die spherically coupled to the seat base, and wherein the dampening member comprises: an elongated rod extending at least partially through the die and movable through the die, the elongated rod comprising a first end spherically coupled to the seat back and a second end opposite from the first end; and a crushable member on the rod between the second end and the die, wherein the crushable member is deformed or crushed as the elongated rod moves through the die.

Illustration 15. The passenger seat of any preceding or subsequent illustrations or combination of illustrations, wherein the dampening member is pulled through the support assembly responsive to the load.

Illustration 16. A passenger seat comprising: a seat base; a seat back pivotably connected to the seat base; and an energy absorption system comprising a support assembly and a dampening member movable relative to the support assembly, wherein the support assembly is coupled to the seat base and the dampening member is coupled to the seat back, and wherein the dampening member is configured to selectively engage the support assembly responsive to a load on the seat back to dampen the load.

Illustration 17. The passenger seat of any preceding or subsequent illustrations or combination of illustrations, wherein the support assembly is spherically coupled to the seat base and the dampening member is spherically coupled to the seat back.

Illustration 18. The passenger seat of any preceding or subsequent illustrations or combination of illustrations, wherein the dampening member is movable through the support assembly responsive to the load, and wherein the dampening member is configured to selectively engage the support assembly such that the support assembly deforms, compresses, or frictionally engages the dampening member to dampen the load.

Illustration 19. A passenger seat comprising: a seat base comprising a forward end and an aft end; a seat back pivotably connected to the seat base, the seat back comprising a top end and a bottom end; and an energy absorption system comprising a support assembly and a dampening member movable relative to and through the support assembly, wherein the dampening member is coupled to the seat back proximate to the bottom end of the seat back, wherein the support assembly is coupled to the seat base proximate to the aft end of the seat base, wherein the dampening member is movable relative to and through the support assembly responsive to a load on the seat back, and wherein movement of the dampening member through the support assembly dampens the load.

Illustration 20. The passenger seat of any preceding or subsequent illustrations or combination of illustrations, wherein the support assembly is spherically coupled to the seat base and the dampening member is spherically coupled to the seat back, and wherein at least one of an outer diameter of the dampening member, a diameter of a central aperture of the support assembly, or a wall thickness of the dampening member is not constant.

Illustrations 21. A method for dampening a load applied to a seat back of a passenger seat using an energy absorption system comprising at least one support assembly and at least one dampening member, the method comprising: receiving a load to a seat back; pivoting the seat back responsive to the applied load; moving the at least one dampening member relative to the support assembly responsive to the load applied to the seat back to dampen the load and reduce a head impact criteria.

Illustration 22. A passenger seat comprising: a seat base; a pivotable seat back; a seat belt coupled to an upper area of the pivotable seat back; an energy absorption system spherically coupled to the seat base at a first attachment point and spherically coupled to the seat back at a second attachment point, the energy absorption system comprising at least one support assembly and at least one dampening member movable relative to the support assembly responsive to a load applied to the pivotable seat back to dampen the load and reduce a head impact criteria.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat comprising:
    a seat base;
    a seat back pivotably connected to the seat base; and
    an energy absorption system rotatably coupled to the seat base and rotatably coupled to the seat back, the energy absorption system comprising a dampening member and a support assembly, wherein:
        the dampening member is movable relative to the support assembly such that engagement between the support assembly and the dampening member dampens a load on the seat back,
        the dampening member comprises an elongated rod, wherein the support assembly comprises a die comprising an inner wall defining a central aperture, and wherein the elongated rod at least partially extends through the central aperture of the die such that the die is on the elongated rod,
        the elongated rod is rotatably coupled to the seat back and wherein the die is rotatably coupled to the seat base, and
        the elongated rod comprises a first end and a second end opposite the first end, wherein the first end is rotatably coupled to the seat back, wherein the second end comprises a stop, wherein the die is on the elongated rod between the first end and the second end, and wherein the die is configured to engage the stop on the elongated rod at a maximum movement position of the elongated rod relative to the support assembly.

2. The passenger seat of claim 1, wherein the energy absorption system is configured to dampen the load and reduce a head impact criteria.

3. The passenger seat of claim 1, wherein the support assembly is on the dampening member such that the dampening member extends through the support assembly, and wherein the dampening member is compressible as the dampening member moves through the support assembly.

4. The passenger seat of claim 3, wherein the support assembly is configured to decrease an outer diameter of the dampening member as the dampening member moves through the support assembly.

5. The passenger seat of claim 1, wherein the die comprises a material having a hardness that is greater than a hardness of a material of the dampening member.

6. The passenger seat of claim 1, wherein at least a portion of the elongated rod is hollow, and wherein a wall thickness of the portion of the elongated rod that is hollow is not constant.

7. The passenger seat of claim 1, wherein the elongated rod comprises an outer diameter, and wherein the outer diameter is not constant between the first end and the second end.

8. The passenger seat of claim 1, wherein the inner wall of the die is not constant.

9. The passenger seat of claim 1, wherein the dampening member further comprises
a crushable member on the elongated rod between the second end and the die, wherein the crushable member is deformed or crushed as the elongated rod moves through the die.

10. The passenger seat of claim 1, wherein the dampening member is pulled through the support assembly responsive to the load.

11. A passenger seat comprising:
a seat base;
a seat back pivotably connected to the seat base; and
an energy absorption system comprising a support assembly and a dampening member movable relative to the support assembly, wherein:
the support assembly is coupled to the seat base and the dampening member is coupled to the seat back,
the dampening member is configured to selectively engage the support assembly responsive to a load on the seat back to dampen the load,
the support assembly comprises an inner wall defining a central aperture, and wherein the dampening member at least partially extends through the central aperture such that the support assembly is on the dampening member, and
the dampening member comprises a first end and a second end opposite the first end, wherein the second end comprises a stop, wherein the support assembly is on the dampening member between the first end and the second end, and wherein the support assembly is configured to engage the stop at a maximum movement position of the dampening member relative to the support assembly.

12. The passenger seat of claim 11, wherein the support assembly is rotatably coupled to the seat base and the dampening member is rotatably coupled to the seat back.

13. The passenger seat of claim 11, wherein the dampening member is movable through the support assembly responsive to the load, and wherein the dampening member is configured to selectively engage the support assembly such that the support assembly deforms, compresses, or frictionally engages the dampening member to dampen the load.

14. A passenger seat comprising:
a seat base comprising a forward end and an aft end;
a seat back pivotably connected to the seat base, the seat back comprising a top end and a bottom end; and
an energy absorption system comprising a support assembly and a dampening member movable relative to and through the support assembly, wherein:
the dampening member is coupled to the seat back proximate to the bottom end of the seat back, wherein the support assembly is coupled to the seat base proximate to the aft end of the seat base, wherein the dampening member is movable relative to and through the support assembly responsive to a load on the seat back, and wherein movement of the dampening member through the support assembly dampens the load,
the dampening member comprises an elongated rod, wherein the support assembly comprises a die comprising an inner wall defining an aperture, and wherein the elongated rod at least partially extends through the aperture of the die, and
the elongated rod comprises a first end and a second end opposite the first end, wherein the second end comprises a stop, wherein the die is on the elongated rod between the first end and the second end, and wherein the die is configured to engage the stop on the elongated rod at a maximum movement position of the elongated rod relative to the support assembly.

15. The passenger seat of claim 14, wherein the support assembly is rotatably coupled to the seat base and the dampening member is rotatably coupled to the seat back, and wherein at least one of an outer diameter of the dampening member, a diameter of a central aperture of the support assembly, or a wall thickness of the dampening member is not constant.

16. The passenger seat of claim 11, wherein at least a portion of the dampening member is hollow, and wherein a wall thickness of the portion of the dampening member that is hollow is not constant.

17. The passenger seat of claim 11, wherein the dampening member comprises an outer diameter, wherein the outer diameter is not constant between the first end and the second end.

18. The passenger seat of claim 14, wherein the dampening member is configured to selectively engage the support assembly such that the support assembly deforms, compresses, or frictionally engages the dampening member to dampen the load.

19. The passenger seat of claim 14, wherein the dampening member further comprises a crushable member on the elongated rod between the second end and the die, wherein the crushable member is deformed or crushed as the elongated rod moves through the die.

20. The passenger seat of claim 14, wherein the energy absorption system is configured to dampen the load and reduce a head impact criteria.

* * * * *